UNITED STATES PATENT OFFICE.

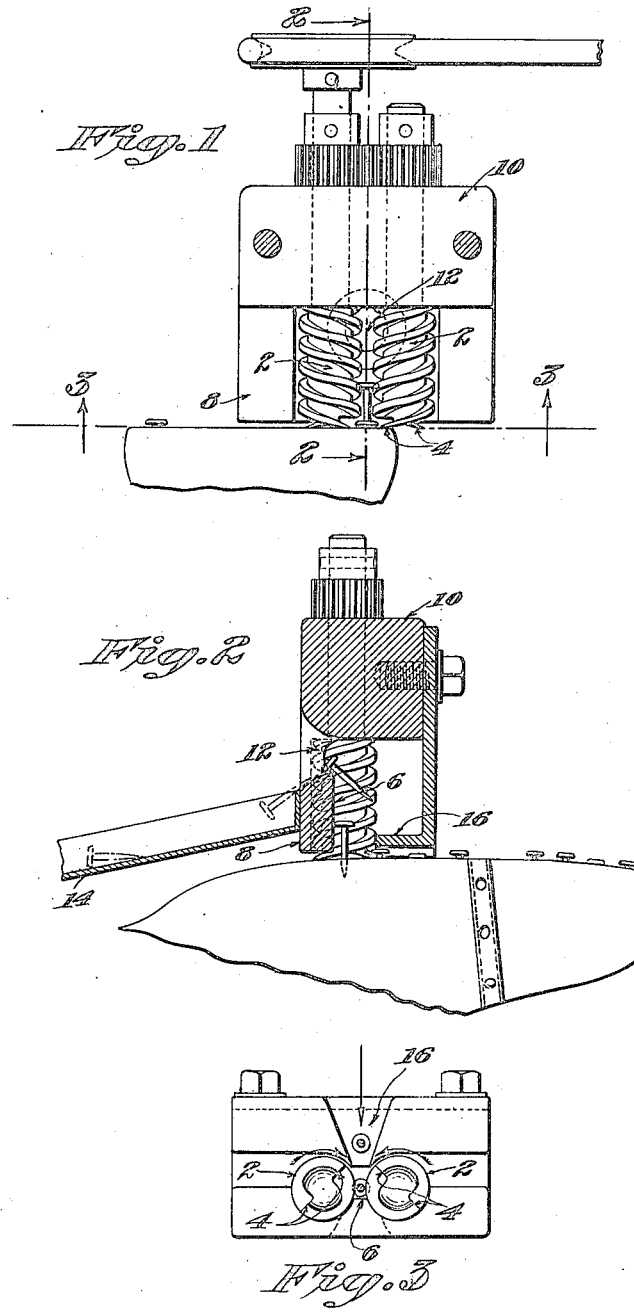

CLIFFORD K. MacDONALD, OF BROCKTON, MASSACHUSETTS, ASSIGNOR TO UNITED SHOE MACHINERY CORPORATION, OF BOSTON, MASSACHUSETTS, A CORPORATION OF NEW JERSEY.

TACK-PULLING MACHINE.

1,372,890.  Specification of Letters Patent.  Patented Mar. 29, 1921.

Application filed May 10, 1919. Serial No. 296,173.

*To all whom it may concern:*

Be it known that I, CLIFFORD K. MAC-DONALD, a citizen of the United States, residing at Brockton, in the county of Plymouth and State of Massachusetts, have invented certain new and useful Improvements in Tack-Pulling Machines; and I do hereby declare the following to be a full, clear, and exact description of the invention, such as will enable others skilled in the art to which it appertains to make and use the same.

The invention relates to machines for pulling tacks and similar headed fastenings, particularly the lasting tacks used to temporarily fasten the upper and lining of a shoe to the last, preparatory to permanently attaching the same, although it may be used in any other capacity where it will satisfactorily perform its intended functions.

This application is a continuation in part of application Serial No. 238,172, filed June 4, 1918, forfeited April 5, 1919.

One feature of the invention contemplates withdrawing the tacks from the last or other object into which they have been driven by two traveling extractor elements spaced to receive a tack between them, and provided with inclined extracting surfaces which move progressively under the head and on opposite sides of the body of the tack while it is guided in a lengthwise direction. A direct and balanced outward pull is thus applied, which will quickly and uniformly withdraw the tacks without danger of bending or breaking them or of injuring the work. The extracting elements and tack guiding means are preferably arranged to form a rectilinear tackway which will operate to straighten any bent tacks as they are drawn into or along the way by the inclined extractor surfaces.

The extractor elements are preferably in the form of two parallel worms or screws which are of opposite pitch, are oppositely rotated, and are spaced to receive the body of the tack between their opposed peripheries while the head projects into the opposite helical grooves between the screw threads. The tack is held in the space between the screws by a parallel guide which in connection with the continuous surface of the screw threads forms the rectilinear tackway for guiding the tack as it is drawn lengthwise by the wedging or lifting action of the screw threads.

In order that the extractor screws may act efficiently on tacks the heads of which are close to the work, the ends of the screws are concave or recessed to form blades at the ends of the screw threads adapted to dig or force themselves under the heads of such tacks. This feature also enables the extractors to operate on sole tacks as well as side tacks, if found desirable.

A machine embodying all the features of the invention in their preferred forms is shown in the accompanying drawings, in which Figure 1 is a front elevation; Fig. 2 a sectional elevation on line 2—2, Fig. 1; and Fig. 3 a sectional view on line 3—3, Fig. 1.

The machine shown is provided with two rotary tack pulling elements in the form of screws 2 of opposite pitch which are mounted with their axes extending substantially in the direction in which the tack is to be pulled, and which are separated by a space approximately the thickness or diameter of the tack body. The screws may be single or multiple threaded, and are so rotated and timed that their threads will act simultaneously and uniformly on the opposite sides of the head of a tack presented between them to draw the tack in the direction of its length. The screws shown are double threaded screws, and the lower ends of the threads are shaped to form substantially radial lips 4. The end of each screw is also preferably recessed within the lips to permit the lips to dig or force themselves into the work immediately under the head of any tack which may be flush or slightly embedded in the surface of the work.

Lengthwise movement of the tack as it is drawn from the work is insured by a stationary guide 6 arranged between the screws and forming therewith a rectilinear tackway which will not only guide the tack in a lengthwise direction, but will act to straighten any tack which may have been bent in driving it into the last. The guide 6 is formed on a head 8 depending from the support 10 in which the screws are journaled. The tackway terminates at its upper end in a discharge opening 12 which is formed in the head 8, and delivers the tacks into a receptacle 14. The head is preferably grooved on opposite sides of the guide to form bearings which partially surround the screws and support them against any spreading force exerted by the tacks, particularly by bent tacks.

A guide plate 16 is arranged at the lower end of the screws, and is provided with a V-shaped groove arranged to guide the tacks to the lower end of the tackway, and into position to be acted upon by the traveling inclined surfaces of the screw threads.

While it is preferred to employ the specific construction and arrangement shown and described, it will be understood that this construction and arrangement is not essential to the broader features of the invention, and may be varied or modified without departing therefrom.

What is claimed is:—

1. A tack pulling machine, having, in combination, two traveling extractor elements spaced to receive a tack between them and provided with inclined extractor surfaces for simultaneously acting on both sides of a tack head, and means for guiding the tack in a lengthwise direction as the extractor surfaces travel under the head.

2. A tack pulling machine, having, in combination, a pair of opposed rotary extractor elements having inclined extracting surfaces adapted to simultaneously travel under the head of a tack presented between the elements and to lift the tack in a lengthwise direction.

3. A tack pulling machine, having, in combination, a pair of opposed rotary extractor elements having extracting surfaces adapted to simultaneously pass under the head of a tack presented between the elements, and means for guiding the tack in the direction of its length.

4. A tack pulling machine, having, in combination, a pair of rotary extractors mounted in spaced relation to define a passage for the tack between them, and provided with extracting surfaces adapted to draw a tack along said passage.

5. A tack pulling machine, having, in combination, a pair of oppositely disposed rotary elements having extracting surfaces adapted to engage a tack presented between them and progressively draw it in a direction substantially parallel to the axis of rotation of one of said elements.

6. A tack pulling machine, having, in combination, a pair of oppositely disposed rotary elements having oppositely pitched spiral extracting surfaces adapted to engage the head of a tack presented between them and withdraw it, and in such withdrawal to straighten the tack if bent.

7. A tack pulling machine, having, in combination, a pair of oppositely revoluble screws spaced from each other to define a passage for a tack between them, the spiral threads of said screws coöperating with each other to engage and draw a tack along said passage.

8. A tack pulling machine, having, in combination, a pair of oppositely revoluble screws spaced from each other to define a passage for a tack between them, the spiral threads of said screws coöperating with each other to engage and draw a tack along said passage, and means for retaining the tack in said passage.

9. A tack pulling machine, having, in combination, a head, a pair of rotary extractors mounted therein in spaced relation to define a tackway, said extractors having spiral tack drawing surfaces and said head having a tack discharge opening at the exit end of the tackway.

10. A tack pulling machine, having, in combination, a head, a pair of oppositely revoluble extractors mounted therein to form a tackway between them, said extractors having oppositely pitched continuous spiral extracting surfaces for engaging the head of a tack presented in said tackway and progressively drawing the tack along the tackway.

11. A tack pulling machine, having, in combination, a head having spaced grooves, a pair of rotary tack extractors mounted in said grooves to form a tackway and maintained against separating movement by the grooves and formed to engage and draw a tack presented thereto.

12. A tack pulling machine, having, in combination, a head having spaced grooves, a pair of screws mounted in said grooves to form a tackway and maintained against spreading movement by the grooves, the threads of said screws being adapted to engage and draw tacks presented in said tackway.

13. A tack pulling machine, having, in combination, a pair of oppositely disposed rotary extractors constructed and arranged to draw a tack along a plane lying between said extractors and in a direction substantially parallel to the axis of rotation of one of said extractors.

14. A tack pulling machine, having, in combination, a pair of rotary extractors having coöperating spiral extracting surfaces adapted to draw a tack along the plane lying between said extractors.

15. A tack pulling machine, having, in combination, means for guiding a tack in a rectilinear path, and a pair of oppositely disposed elements coöperating with said guiding means and constructed and mounted to draw a tack along a plane lying between said elements, and in such withdrawal to straighten the tack if bent.

16. A tack pulling tool comprising a rotary screw having its end recessed within the screw thread to form a lip at the end of the thread adapted to dig or force itself under the embedded head of a tack.

17. A tack pulling machine, having, in combination, a pair of oppositely pitched and oppositely retatable screws spaced to receive the body of a tack between them, and having their lower ends recessed within the screw threads to form lips at the ends of the threads adapted to dig or force themselves under the embedded head of a tack.

CLIFFORD K. MacDONALD.